UNITED STATES PATENT OFFICE.

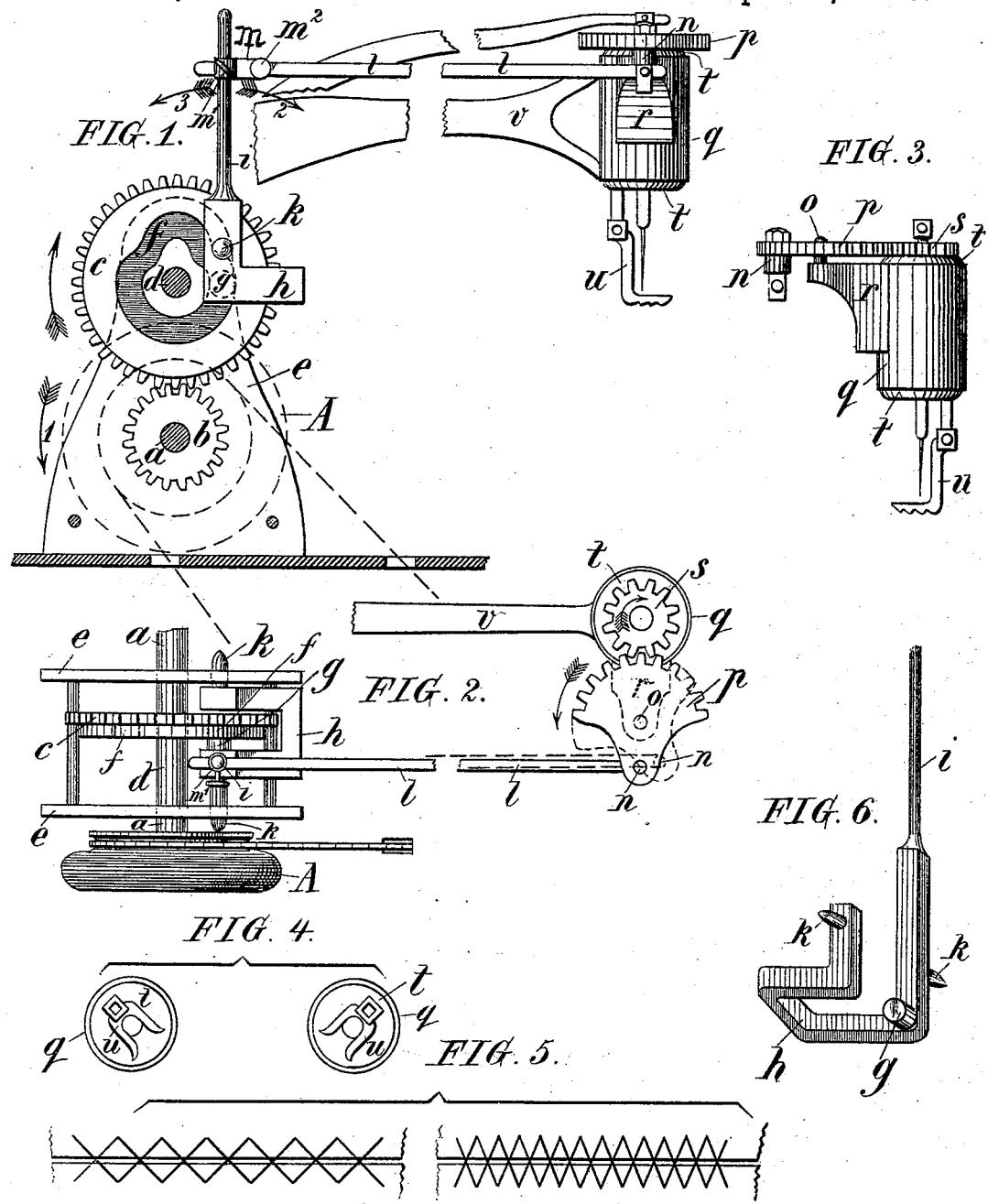

ALBERT WEDERMANN, OF VIENNA, AUSTRIA-HUNGARY.

SEWING-MACHINE.

SPECIFICATION forming part of Letters Patent No. 340,178, dated April 20, 1886.

Application filed December 15, 1885. Serial No. 185,716. (No model.) Patented in Germany May 3, 1885, No. 33,298.

*To all whom it may concern:*

Be it known that I, ALBERT WEDERMANN, of Vienna, Austria-Hungary, have invented a new and useful Improvement in Sewing-Machines, (for which I have obtained a patent in Germany, No. 33,298, dated May 3, 1885,) of which the following is a specification.

This invention relates to improvements in sewing-machines, and especially to a device which manipulates the feeder in such a manner that the threads connecting alternate stitches cross each other so that a whipped or overcast seam is produced.

The invention is fully explained with reference to the annexed drawings.

Figure 1 is a side view of the upper part of a sewing-machine provided with these improvements. For the sake of clearness, the foremost standard is omitted and the main arm of the machine as well as the needle-bar lever are merely indicated. Fig. 2 is a plan of the same. Figs. 3, 4, 5, and 6 are details. Fig. 3 is a front view of the cylinder, its toothed wheel, and the toothed segment. Figs. 4, 5, and 6 will be explained hereinafter.

Upon the arbor $a$ of the driving-wheel, which arbor has its bearing in the main arm of the machine, is mounted a toothed wheel, $b$, which meshes with a second toothed wheel, $c$, of a diameter twice as large as that of the former. The arbor $d$ of the latter wheel has its bearings in the two standards, $e$. This upper larger wheel is provided with an eccentrically-curved groove, $f$, in which runs a friction-roller, $g$, held by a bar, $i$, which is provided with the yoke $h$, (giving room to the wheel $c$,) and which is capable of turning around the studs $k$, having their bearings in the standards $e$. (Fig. 6 represents a perspective view of this bar $i$, yoke $h$, roll $g$, and studs $k$.) This bar $i$ is connected to a rod or pitman, $l$, by means of a link, $m$, forming at $m'$ a sleeve capable of being shifted along the bar $i$, while at $m^2$ a simple hinge secures the requisite mobility of the bar $l$. At its opposite end the bar or pitman $l$ is connected to a toothed segment, $p$, adapted to turn around the pivot $o$. This pivot $o$ is mounted on a separate support, $r$, expressly fixed for the purpose on the sleeve $g$ of the cylinder, Fig. 3. The toothed segment $p$ meshes with a toothed wheel, $s$, which is keyed to the cylinder proper, $t$, of the machine, to which the cloth-feeder or "transporteur" $u$ is rigidly connected. This cylinder $t$ has its bearings inside of the sleeve, and can turn freely.

The apparatus works as follows: Supposing the driving-wheel A and with it the toothed wheel $b$ are turned around in the direction of the arrow 1, (which may be effected by treadle, hand-wheel, steam or water power, &c.,) then the upper toothed wheel, $c$, will turn in opposite direction, and by virtue of its curved groove will act upon the friction-roller $g$ of bar $i$ in such a manner that this latter bar will turn in the direction of the arrow 2—namely, to the right—and consequently will also move the bar $l$ to the right, and that during all the time which it takes for the lower wheel to make a complete revolution (or for the upper one to make half a revolution) during the second complete revolution of the lower wheel (or the second half-revolution of the upper wheel) the peculiar shape of the groove effects that the whole mechanism (exclusive of the two toothed wheels $b$ and $c$) is moved in opposite direction—that is to say, retracted in the direction of the arrow 3. Consequently during two revolutions of the driving-wheel the toothed segment $p$, which meshes with the toothed wheel $s$, will have brought the cloth-feeder successively into two different positions, as shown in Fig. 4, in consequence of which the needle executes cross-stitches, Fig. 5, which are suitable for producing a whipped or overcast seam.

It is understood that the angle inclosed by the threads connecting alternate stitches may be decreased or increased by adjusting or moving the connecting-link $m$ along the bar $i$, so that any desirable form of cross-stitches may be produced, as shown in Fig. 5. It is also evident that the details of construction may be varied without departing from the nature of this invention.

What I claim is—

In a sewing-machine for producing a whipped or overcast seam, the combination of the toothed wheel $b$, the toothed wheel $c$, provided with groove $f$, the bar $i$, provided with the roll $g$, yoke $h$, and studs $k$, rod $l$, provided with the links $m$ $m'$ $m^2$, toothed segment $p$, toothed wheel $s$, cylinder $t$, sleeve $q$, and cloth-feeder $u$, substantially as and for the purpose described.

In testimony whereof I have signed this specification in the presence of two subscribing witnesses.

ALBERT WEDERMANN.

Witnesses:
EDMUN JUSSEN,
SAMUEL WERTHERI.